United States Patent [19]

Nakashima et al.

[11] Patent Number: 5,262,505
[45] Date of Patent: Nov. 16, 1993

[54] SILICONE MODIFIED POLYIMIDE RESIN AND METHOD FOR PREPARING SAME

[75] Inventors: Hisataka Nakashima; Tadashi Okawa, both of Ichihara, Japan

[73] Assignee: Dow Corning Toray Silicone Co. Ltd., Tokyo, Japan

[21] Appl. No.: 918,293

[22] Filed: Jul. 22, 1992

[30] Foreign Application Priority Data

Jul. 30, 1991 [JP] Japan ................... 3-212642

[51] Int. Cl.$^5$ ............................................. C08G 77/26
[52] U.S. Cl. ......................................... 528/26; 528/28; 528/38; 525/431
[58] Field of Search ............................ 528/38, 26, 28; 525/431

[56] References Cited

U.S. PATENT DOCUMENTS

| | | | |
|---|---|---|---|
| 4,051,163 | 9/1977 | Berger | 528/38 |
| 5,036,145 | 7/1991 | Echterling et al. | 525/431 |
| 5,073,607 | 12/1991 | Katz | 525/431 |
| 5,118,777 | 6/1992 | Okawa | 528/34 |

FOREIGN PATENT DOCUMENTS 143328 9/1982 Japan .
22830 1/1987 Japan .

OTHER PUBLICATIONS

Y. Oishi et al. in Macro molecules 1992, 24, 3475–3480.

*Primary Examiner*—John C. Bleutge
*Assistant Examiner*—Margaret W. Glass
*Attorney, Agent, or Firm*—Robert Spector

[57] ABSTRACT

A polyimide resin is prepared by reaction of a tetracarboxylic dianhydride with a specified class of amino functional organosilicon compounds followed by cycloimidization of the resultant polyamide acid intermediate. The resin is characterized by an excellent adhesion to various types of inorganic substrates such as glass. The present method employs relatively low temperatures for the cycloimidization reaction.

6 Claims, No Drawings

SILICONE MODIFIED POLYIMIDE RESIN AND METHOD FOR PREPARING SAME

BACKGROUND OF THE INVENTION

1. Field of the Invention

The present invention relates to novel silicone-modified polyimide resins and to a method for preparing these resins. More specifically, the present invention relates to novel silicone-modified polyimide resins that exhibit an excellent heat resistance, adhesion and bonding ability. The resins are therefore useful as an electrical insulating material, coating material, and adhesive. The present invention also relates to a method for the preparation of these novel silicone-modified polyimide resins.

2. Background Information

Polyimide resins are known to be heat-resistant materials with excellent mechanical strength, chemical resistance, and electrical insulating performance, and are therefore employed as heat-resistant films, adhesives, coatings, molding resins, and encapsulating resins.

The excellent property profile of polyimide resins make them particularly useful as electrical and electronic materials in a wide range of applications. These applications include but are not limited to enamel-wire coating agents, films for copper-laminated printed circuit boards, insulating films and sheets, various types of insulating coating agents, alpha-ray shielding films, cloth impregnation agents, and adhesives.

A deficiency of polyimide resins is their poor adhesion to inorganic substrates such as glass, ceramics, and silicon wafers. Some of the methods already proposed for remedying this deficiency are: (i) preliminary treatment of the substrate with a silane coupling agent; (ii) combining a silane coupling agent with a solution of the polyamic acid precursor of the resin; and (iii) introducing an aminoalkyl-substituted silyl group into the molecule of the polyamic acid. This approach is described in Kobunshi, Volume 33, Number 11, pp. 830–834 (1984)).

The disadvantage of treating the substrate with a silane coupling agent in accordance with method (i) is that addition of this treatment step makes the entire coating process more complicated and therefore adversely affects the work flow of this process. While addition of silane coupling agent to the solution of the polyamic acid intermediate as described in method (ii) yields an improvement in adhesion, the presence of the silane substantially decreases the viscosity of the polyamic acid intermediate.

The introduction of substituted silyl groups into the polyamic acid intermediate in accordance with method (iii) does not achieve satisfactory adhesion because the substituted silyl group can be introduced only at the terminal positions of the polyamic acid. Finally, all three prior art methods require lengthy heating at temperatures of at least 200° C. to achieve imidization of the polyamic acid.

SUMMARY OF THE INVENTION

One objective of the present invention is to provide a polyimide resin that can be obtained by imidization of the corresponding polyamic acid at relatively low temperatures and which strongly adheres to inorganic substrates such as glass, ceramic materials, and silicon wafers.

DETAILED DESCRIPTION OF THE INVENTION

The objectives of this invention are achieved by providing a silicone-modified polyimide resin with repeating units corresponding to the formula

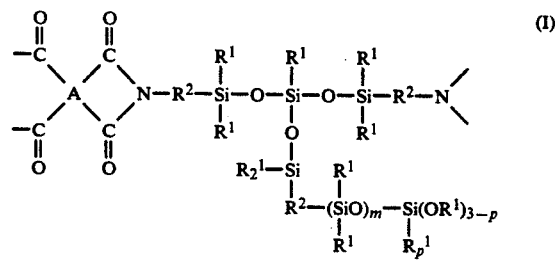

where A is a tetrafunctional hydrocarbon radical, each $R^1$ is individually selected from the group consisting of monovalent hydrocarbon radicals free of aliphatic unsaturation bonds, each $R^2$ is individually selected from the group consisting of divalent hydrocarbon radicals free of aliphatic unsaturation, m is an integer from zero to 100, and p is 0 or 1.

The polyimide is prepared by reaction of a tetracarboxylic dianhydride with an amino functional organosilicon compound represented by general formula I,

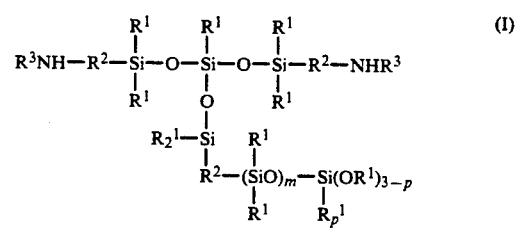

where $R^1$, $R^2$, m and p are defined in the preceding section of this specification and $R^3$ represents the hydrogen atom or a trihydrocarbylsilyl group.

This invention also provides a method for preparing silicone-modified polyimide resins, the method comprising the steps of (1) preparing a polyamic acid intermediate by the reaction of tetracarboxylic dianhydride and an amino-functional organosilicon compound of the general formula I, and (2) subjecting said intermediate to cycloimidization.

To explain the present invention in greater detail, the tetracarboxylic dianhydride used as one of the starting materials for preparing the present polyimides can be any of those already known in the art as starting materials for polyimide resins. The dianhydride can be represented by the general formula

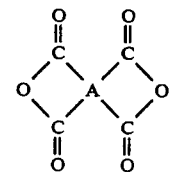

where A represents a tetravalent hydrocarbon radical.

Suitable tetracarboxylic dianhydrides include but are not limited to aromatic tetracarboxylic dianhydrides such as pyromellitic dianhydride, benzophenonetetracarboxylic dianhydride, and diphenyltetracarboxylic dianhydride; alicyclic tetracarboxylic dianhydrides such as cyclobutanetetracarboxylic dianhydride, cyclopentanetetracarboxylic dianhydride, and cyclohexanetetracarboxylic dianhydride; and aliphatic tetracarboxylic dianhydrides such as butanetetracarboxylic dianhydride.

In the preceding formula I for the amino-functional organosilicon compounds used in the present method, the substituents represented by $R^1$ are identical or different monovalent hydrocarbon radicals that are free of aliphatic unsaturation. Examples of suitable $R^1$ radicals include alkyl radicals such as methyl, ethyl, and propyl; aryl radicals such as phenyl, tolyl, and xylyl; and substituted alkyl radicals such as chloromethyl, perfluoromethyl and 3,3,3-trifluoropropyl.

The substituents represented by $R^2$ are identical or different divalent hydrocarbon radicals free of aliphatic unsaturation, and include but are not limited to alkylene radicals such as methylene, ethylene, n-propylene, isopropylene, and n-butylene, and arylene radicals such as phenylene and tolylene.

$R^3$ is the hydrogen atom or a trihydrocarbylsilyl group exemplified by but not limited to trimethylsilyl and t-butyldimethylsilyl.

The subscript m is 0 or an integer with a value of from 1 to 100 and p is 0 or 1.

In preferred embodiments of the amino-functional organosilicon compound $R^1$ is lower alkyl, most preferably methyl, $R^2$ is alkylene, most preferably ethylene, $R^3$ is trimethylsilyl, m is 0 or an integer from 1 to about 5 and p is 0.

The amino-functional organosilicon compound can be synthesized by various methods, one of which is represented by the following two equations.

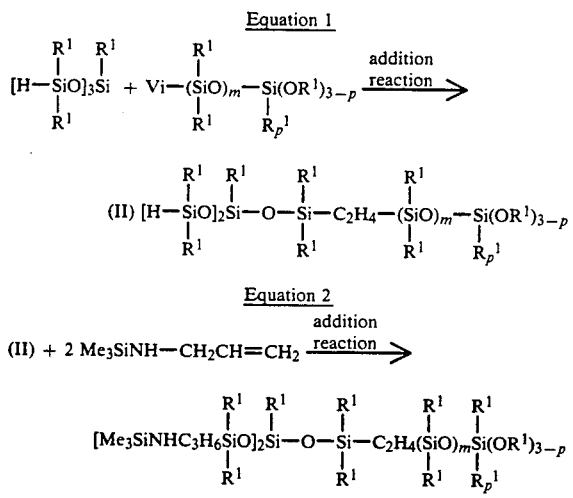

In these equations $R^1$ is defined in a preceding section of this specification, Vi is vinyl and Me represents methyl.

A characterizing feature of the present invention is the use of the diamino-functional organosilicon compound represented by formula I as the diamine reactant for preparing the polyimide resin. The use of this organosilicon compound improves the adhesion of the polyimide resin to various types of substrates by the presence of a large concentration of silicon-bonded hydrolyzable groups into the side chains of the resin.

The diamino functional organosilicon compound represented by formula I can be copolymerized in combination with a second type of diamine that includes both organic diamines and amino functional organosilicon compounds. The second type of diamine includes but is not limited to aromatic diamines such as p-phenylenediamine, m-phenylenediamine, diaminodiphenylmethane, diaminodiphenyl ether, 2,2-diaminodiphenylpropane, diaminodiphenyl sulfone, diaminobenzophenone, diaminonaphthalene, 1,3-bis(4-aminophenoxy)benzene, 1,4-bis(4-aminophenoxy)benzene, 4,4'-di(4-aminophenoxy)diphenyl sulfone, and 2,2'-bis[4-(4-aminophenoxy)phenyl]propane; alicyclic and aliphatic diamines; and the diamino-terminated organopolysiloxane described in Japanese Patent Application Laid-Open Application Number 57-143328 [143,328/82].

The present polyimide resins are prepared by (1) reacting a tetracarboxylic dianhydride with the amino functional organosilicon compound represented by formula I to yield a polyamic acid intermediate and by then (2) subjecting this intermediate to cycloimidization.

Synthesis of the polyamic acid intermediate is typically carried out using a solution polymerization. Solvents suitable for use in this type of polymerization include but are not limited to N,N-dimethylformamide, N,N-dimethylacetamide, N-methyl-2-pyrrolidinone, N-methylcaprolactam, dimethyl sulfoxide, tetramethylurea, pyridine, dimethyl sulfone, hexamethylphosphoramide, and butyrolactone. These solvents can be used individually or in mixtures containing two or more of these solvents.

The reaction temperature for preparing the polyamic acid intermediate is typically within the range from $-20°$ to $150°$ C., the range from $-5°$ to $100°$ C. being particularly preferred.

A thermally induced cycloimidization reaction is typically used to convert the polyamic acid intermediate to the corresponding polyimide resin. While the temperature of the cycloimidization temperature can be from $140°$ to $400°$ C., and preferably from $150°$ to $250°$ C., the present polyamic acids can be completely imidized at relatively low temperatures no greater than $200°$ C. The time required for this cycloimidization will vary in accordance with the reaction temperature, and is typically from 30 seconds to 10 hours, preferably from 5 minutes to 5 hours.

The following examples describe preferred polyimides of this invention and methods for preparing these polymers. The examples should not be interpreted as limiting the scope of the invention defined in the accompanying claims. Unless otherwise specified all parts and percentages are by weight and viscosities were measured at $25°$ C.

EXAMPLE 1

The following ingredients were charged under nitrogen into a four-neck flask equipped with stirrer, reflux condenser, addition funnel, and thermometer, and then stirred to form a solution: 8.9 g pyromellitic dianhydride, 0.93 g phthalic anhydride as a molecular weight regulator, 167.6 g N-methyl-2-pyrrolidinone (NMP). A solution consisting of 29.7 g of the organosilicon compound corresponding to formula Ia dissolved in 15.0 g NMP was added dropwise to the resultant mixture over a 30 minute period. Stirring for 1 hour at $26°$ C. after the completion of the addition yielded a solution of the corresponding polyamic acid in NMP. The solubilized polyamic acid was placed in a Teflon container and heated in an oven at 160° C. for 3 hours and then 200° C. for 3 hours to yield the polyimide resin.

The following observations were made using the infrared spectrum of the polyimide product: the absorption attributed to the carbonyl in the amide group was not observed, and absorptions assigned to the carbonyl portion of an imide group were observed at 1,720 and 1,780 cm$^{-1}$. Thermogravimetric analysis of the polyimide resin demonstrated a 1% weight loss temperature of 386° C. in nitrogen and 327° C. in air.

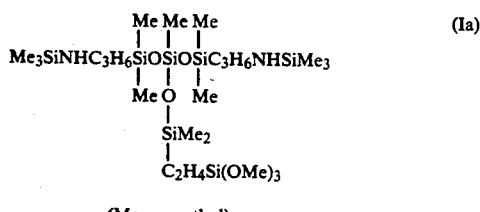

(Me = methyl)

EXAMPLE 2

The following ingredients were charged under nitrogen to a four-neck flask equipped with stirrer, reflux condenser, addition funnel, and thermometer, and stirred until completely dissolved: 3.9 g pyromellitic dianhydride, 0.41 g phthalic anhydride as a molecular weight regulator, and 68.6 g NMP. A solution prepared by dissolving 18.8 g of the amino functional organosilicon compound of formula Ib in 18.6 g of NMP was added dropwise to the resultant solution over a 20 minute period. The reaction mixture was stirred for 1.5 hours at 35° C. following completion of the addition to yield a solution of the corresponding polyamic acid. This solution was coated on a glass plate and the coated plate was heated in an oven at 160° C. for 3 hours to yield the corresponding polyimide resin. The polyimide resin-coated plate was then immersed in boiling water and removed at specified intervals. The resistance to peeling of the coating was evaluated by adhering a commercially available cellophane tape to the coated surface of the plate, pulling off the tape and examining the tape to determine whether any of the coating had adhered to it.

No polyimide resin adhered to the tape even after immersion of the resin-coated plate in boiling water for 5 hours.

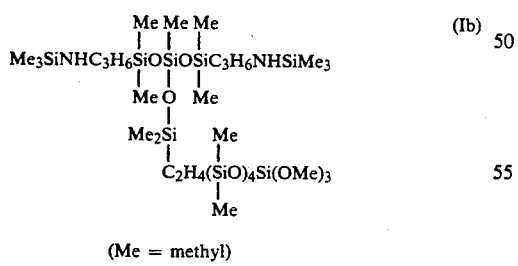

(Me = methyl)

EXAMPLE 3

The following ingredients were charged under nitrogen to a four-neck flask equipped with a stirrer, reflux condenser, addition funnel, and thermometer, and stirred until completely dissolved: 14.6 g benzophenonetetracarboxylic dianhydride, 0.896 g phthalic anhydride as a molecular weight regulator, and 132.0 g N,N-dimethylacetamide (DMAc). A solution of 25.7 g of the amino-functional organosilicon compound corresponding to formula Ic in 12.3 g DMAc was added to the resultant solution over a 30 minutes period. The reaction mixture was stirred for 1 hour at a temperature of 28° C. following completion of addition to yield a DMAc solution of the corresponding polyamic acid. This solution was coated on a glass plate and the plate was heated in an oven at 160° C. for 3 hours to produce the corresponding polyimide resin.

The polyimide resin adhered strongly to the glass and a silicon wafer, had excellent moisture resistance, and heat and chemical resistance in addition to mechanical and electrical insulating properties.

This polyimide resin is suitable for a variety of end-use applications, including but not limited to protective films for the surface of semiconductor elements and for diodes.

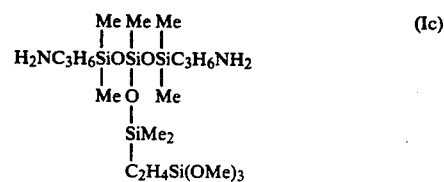

(Me = methyl)

EXAMPLE 4

The following ingredients were charged under nitrogen to a four-neck flask equipped with stirrer, reflux condenser, addition funnel, and thermometer and then stirred to obtain a solution: 6.86 g of benzophenone tetracarboxylic dianhydride, 0.630 g of phthalic anhydride as a molecular weight regulator, and 78.5 g of N,N-dimethylacetamide (DMAc). A solution containing 24.8 g of the amino functional organosilicon compound corresponding to formula Id and 9.8 g DMAc was added to the resultant solution over a 30 minute period.

The resultant reaction mixture was stirred for one hour following completion of the addition while the temperature was maintained at 29° C. The resultant DMAc solution of the corresponding polyamic acid was coated on a glass plate and the plate heated in an oven at 160° C. for 3 hours to yield the corresponding polyimide resin. The resin adhered strongly to the glass.

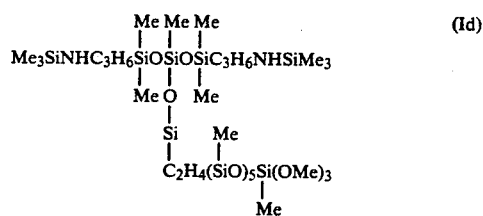

(Me = methyl)

EXAMPLE 5

2.9 g pyromellitic dianhydride and 49.4 g NMP were charged under nitrogen to a four-neck flask equipped with stirrer, reflux condenser, addition funnel, and thermometer. Stirring was continued until the solid materials dissolved. A solution of 8.9 g of the amino functional organosilicon compound corresponding to formula Ie in 15.3 g NMP was added over a 30 minute period to the solution in the reactor, at which time the reaction mixture was stirred for 3 hours while being maintained at a temperature of 28° C. to yield the corresponding polyamic acid. This solution was placed in a Teflon container and heated in an oven at 180° C. for 3 hours to form the corresponding polyimide resin. The elemental analysis of the polyimide was in excellent agreement with the calculated values, as reported below.

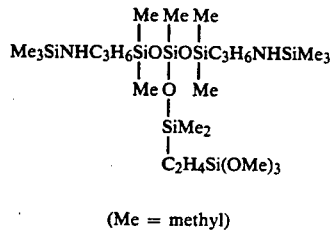

(Me = methyl)

Elemental Analysis: Calculated for: $(C_{28}H_{48}O_{10}N_2Si_5)_n$: C 47.16; H 6.78; N 3.93. Measured: C 47.54; H 6.70; N 3.93.

EXAMPLE 6

2.2 g pyromellitic dianhydride and 51.6 g NMP were charged under nitrogen to a four-neck flask equipped with stirrer, reflux condenser, addition funnel, and thermometer. Stirring was continued until the solid materials dissolved. A solution of 9.8 g of amino functional organosilicon compound corresponding to formula If in NMP was added to the reactor dropwise over a period of 30 minutes. Following completion of the addition the reaction mixture was stirred for 3 hours while being maintained at a temperature of 25° C. to yield a solution of the polyamic acid. This solution was placed in a Teflon container and heated in an oven at 160° C. for 3 hours to yield the corresponding polyimide resin. The elemental analysis of the polyimide was in excellent agreement with the calculated values, both of which are as reported below.

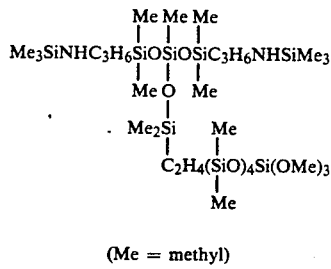

(Me = methyl)

Elemental Analysis: Calculated For: $(C_{36}H_{72}O_{14}N_2Si_9)_n$: C 42.82; H 7.19; N 2.77. Measured: C 42.58; H 7.27; N 2.57.

That which is claimed is:

1. A silicone-modified polyimide resin wherein the repeating units exhibit the formula

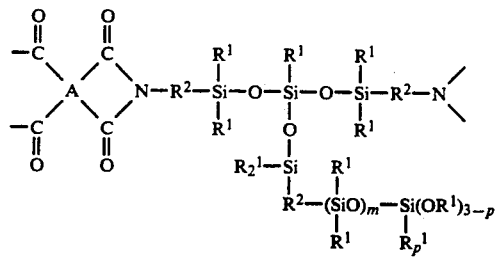

where A represents a trifunctional hydrocarbon radical, each $R^1$ is individually selected from the group consisting of monovalent hydrocarbon radicals free of aliphatic unsaturation, each $R^2$ is individually selected from the group consisting of divalent hydrocarbon radicals free of aliphatic unsaturation, m is an integer from zero to 100, and p is zero or 1.

2. A polyimide resin according to claim 1 where $R^1$ is lower alkyl, $R^2$ is alkylene, m is 0 or an integer from 1 to about 5 and p is 0.

3. A silicone-modified polyimide resin prepared by the reaction of a tetracarboxylic dianhydride with an amino-functional organosilicon compound corresponding to general formula I

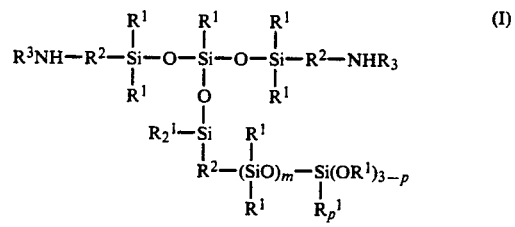

wherein each $R^1$ is individually selected from the group consisting of monovalent hydrocarbon radicals free of aliphatic unsaturation, each $R^2$ is individually selected from the group consisting of divalent hydrocarbon radicals free of aliphatic unsaturation, $R^3$ is the hydrogen atom or a trihydrocarbylsilyl group, m is 0 or an integer from zero to 100, and p is zero or one.

4. A polyimide according to claim 3 where $R^1$ is lower alkyl, $R^2$ is alkylene, $R^3$ is trimethylsilyl, m is 0 or an integer from 1 to about 5 and p is 0.

5. A method for preparing a silicone-modified polyimide resin, wherein said method is characterized by the preparation of a polyamic acid intermediate by the reaction of a tetracarboxylic dianhydride and amino-containing organosilicon compound with the following general formula

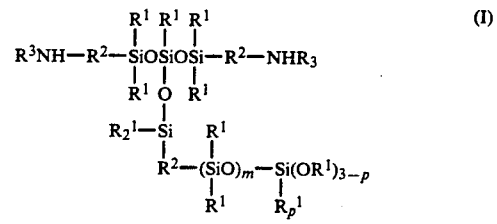

and subsequently subjecting said intermediate to cycloimidization, wherein each $R^1$ is individually selected from the group consisting of monovalent hydrocarbon radicals free of aliphatic unsaturation, each $R^2$ is individually selected from the group consisting of divalent hydrocarbon radicals free of aliphatic unsaturation, $R^3$ is the hydrogen atom or a trihydrocarbylsilyl group, m is 0 or an integer from zero to 100, and p is zero or one.

6. A method according to claim 5 where $R^1$ is lower alkyl, $R^2$ is alkylene, $R^3$ is trimethylsilyl, m is 0 or an integer from 1 to about 5 and p is 0.

* * * * *